(12) United States Patent
Hoffstein et al.

(10) Patent No.: US 6,959,085 B1
(45) Date of Patent: Oct. 25, 2005

(54) SECURE USER IDENTIFICATION BASED ON RING HOMOMORPHISMS

(75) Inventors: Jeffrey Hoffstein, Pawtucket, RI (US); Joseph H. Silverman, Needham, MA (US); Daniel Lieman, Columbia, MO (US)

(73) Assignee: NTRU Cryptosystems, Inc., Burlington, MA (US)

( * ) Notice: Subject to any disclaimer, the term of this patent is extended or adjusted under 35 U.S.C. 154(b) by 0 days.

(21) Appl. No.: 09/564,112

(22) Filed: May 3, 2000

Related U.S. Application Data

(60) Provisional application No. 60/132,199, filed on May 3, 1999.

(51) Int. Cl.$^7$ .............................................. H04L 9/00
(52) U.S. Cl. .............................. 380/30; 380/2; 380/28; 380/30; 380/100; 713/156; 713/168; 713/171; 713/176; 713/180
(58) Field of Search .......................................... 380/30

(56) References Cited

U.S. PATENT DOCUMENTS

| | | | | |
|---|---|---|---|---|
| 4,995,082 A | * | 2/1991 | Schnorr ....................... | 713/169 |
| 5,054,066 A | * | 10/1991 | Riek et al. ..................... | 380/30 |
| 5,220,606 A | | 6/1993 | Greenberg .................... | 380/43 |
| 5,740,250 A | | 4/1998 | Moh ............................. | 380/28 |
| 5,790,675 A | * | 8/1998 | Patarin ....................... | 713/180 |
| 5,805,703 A | * | 9/1998 | Crandall ....................... | 380/30 |
| 5,889,865 A | * | 3/1999 | Vanstone et al. ........... | 713/171 |
| 5,974,142 A | | 10/1999 | Heer et al. ..................... | 380/9 |
| 5,982,891 A | | 11/1999 | Ginter et al. .................. | 380/4 |
| 6,076,163 A | | 6/2000 | Hoffstein et al. ........... | 713/168 |
| 6,081,597 A | | 6/2000 | Hoffstein et al. ............. | 380/28 |
| 6,144,740 A | * | 11/2000 | Laih et al. ..................... | 380/2 |
| 6,286,022 B1 | * | 9/2001 | Kaliski et al. ............. | 708/492 |
| 6,298,137 B1 | | 10/2001 | Hoffstein et al. ............. | 380/30 |
| 6,480,605 B1 | * | 11/2002 | Uchiyama et al. ............ | 380/30 |
| 6,526,509 B1 | * | 2/2003 | Horn et al. .................. | 713/171 |

FOREIGN PATENT DOCUMENTS

FR  2737370  1/1997

OTHER PUBLICATIONS

M. Ajtai, C. Dwork, "Public–Key Cryptosystem With Worst Case/Average Case Equivalence" In Proc. 29th ACM Symposium On Theory Of Computing, 1997, pp. 284–294.

E.R. Brickell and K.S. McCurley, "Interactive Identification And Digital Signatures", AT&T Technical Journal, Nov./Dec., 1991, pp. 73–86.

O. Goldreich, S. Goldwasser, S. Halevy, "Public–Key Cryptography From Lattice Reduction Problems", In Proc. CRYPTO'97 Lect. Notes in Computer Science 1294, Springer–Verlag, 1997, pp. 112–131.

(Continued)

*Primary Examiner*—Thomas R. Peeso
*Assistant Examiner*—Syed A. Zla
(74) *Attorney, Agent, or Firm*—Martin Novack

(57) ABSTRACT

A method for authenticating, by a second user, the identity of a first user, that includes a challenge communication from the second user to the first user, a response communication from the first user to the second user, and a verification by the second user, includes the steps: selection by the first user of a private key f in a ring R and a public key that includes φ(f) in a ring B that is mapped from f using the ring homomorphism φ: R→B, and publication by the first user of the public key; generation of the challenge communication by the second user that includes selection of a challenge c in the ring R; generation of the response communication by the first user that includes computation of a response comprising h in the ring R, where h is a function of c and f; and performing of a verification by the second user that includes determination of φ(c) from c, φ(h) from h, and an evaluation that depends on φ(h), φ(c) and φ(f).

75 Claims, 6 Drawing Sheets

OTHER PUBLICATIONS

L.C. Guillou and J.-J. Quisquater, "A Practical Zero-Knowledge Protocol Fitted To Security Microprocessor Minimizing Both Transmission And Memory", In C.G. Gunther, Editor, Advances In Cryptology—Eurocrypt '88, Lecture Notes In Computer Science 330, Springer–Verlag (1988) pp. 123–128.

J. Hoffstein, J. Pipher, J. Silverman, NTRU: "A Ring–Based Public Key System", Proceedings of ANTS III, Portland (1998), Springer–Verlag.

A.K. Lenstra, H.W. Lenstra Jr., L. Lovasz, "Factoring Polynomials With Rational Coefficients", Mathematische Ann. 261 (1982), pp. 513–643.

A. May, "Cryptanalysis of NTRU", preprint, Feb. 1999.

R. Merkle, M. Hellman, "Hiding Information And Signatures In Trapdoor Knapsacks", IEEE Trans. Inform. Theory, IT–24: pp. 525–530, Sep. 1978.

T. Okamoto, "Provably Secure And Practical Identification Schemes And Corresponding Signature Schemes", In E.F. Brickell, Editor, Advances In Cryptology—Crypto '92, Lecture Notes In Computer Science 740, Springer–Verlag.

C.-P. Schnorr, "A Hierarchy Of Polynomial Time Lattice Basis Reduction Algorithms", Theoretical Computer Science 53 (1987), pp. 201–224.

C.-P. Schnorr, "A More Efficient Algorithm For Lattice Basis Reduction", J. Algorithms (1988), pp. 47–62, (1993) pp. 31–53.

C.-P. Schnorr, "Efficient Identification And Signatures For Smart Cards", In G. Brassard, Editor, Advances In Cryptology—Crypto '89, Lecture Notes In Computer Science 435, Springer–Verlag (1990) pp. 239–251.

A. Shamir, "A Polynomial–Time Algorithm For Breaking The Basic Merkel–Hellman Cryptosystem", In Proceedings Of The 23rd IEEE Symposium On Foundations of Computer Science, IEEE, 1982, 145–152.

A. Shamir, "An Efficient Identification Scheme Based On Permuted Kernels", In G. Brassard, Editor, Advances In Cryptology—Crypto '89, lecture Notes In Computer Science 435, Springer–Verlag (1990) pp. 606–609.

J./h. Silverman, "Dimension–Reduced Lattices, Zero–Forced Lattices, and The NTRU Public Key Cryptosystem", NTRU Technical Note 013, Mar. 2, 1999, <www.ntru.com>.

J. Stern, "A New Identification Scheme Based On Syndrome Decoding", In D. Stinson, Editor, Advances In Cryptology—Crypto '93, Lecture Notes In Computer Science 773, Springer–Verlag (1994) pp. 13–41.

J. Stern, "Designing Identification Schemes With Keys Of Short Size", In Y.G. Desmedt, Editor, Advances In Cryptology—Crypto '94, Lecture Notes In Computer Science 839, Springer–Verlag (1994) pp. 164–173.

* cited by examiner

SECURE USER IDENTIFICATION BASED ON RING HOMOMORPHISMS

RELATED APPLICATION

This application claims priority from U.S. Provisional Patent Application No. 60/132,199, filed May 3, 1999, and said Provisional Patent Application is incorporated herein by reference.

FIELD OF THE INVENTION

The present invention relates generally to secure communication and document identification over computer networks or other types of communication systems and, more particularly, to secure user identification and digital signature techniques based on ring homomorphisms. The invention also has application to communication between a card, such as a "smart card", or other media, and a user terminal.

BACKGROUND OF THE INVENTION

User identification techniques provide data security in a computer network or other communications system by allowing a given user to prove its identity to one or more other system users before communicating with those users. The other system users are thereby assured that they are in fact communicating with the given user. The users may represent individual computers or other types of terminals in the system. A typical user identification process of the challenge-response type is initiated when one system user, referred to as the Prover, sends certain information in the form of a commitment to another system user, referred to as the Verifier. Upon receipt of the commitment, the verifier sends a challenge to the Prover. The Prover uses the commitment, the challenge, and its private key to generate a response, which is sent to the Verifier. The Verifier uses the commitment, the response and a public key to verify that the response was generated by a legitimate prover. The information passed between the Prover and the Verifier is generated in accordance with cryptographic techniques which insure that eavesdroppers or other attackers cannot interfere with or forge the identification process.

It is well known that a challenge-response user identification technique can be converted to a digital signature technique by the Prover utilizing a one-way hash function to simulate a challenge from a Verifier. In such a digital signature technique, a Prover generates a commitment and applies the one-way hash function to it and a message to generate the simulated challenge. The Prover then utilizes the simulated challenge, the commitment and a private key to generate a digital signature, which is sent along with the message to the Verifier. The Verifier applies the same one-way hash function to the commitment and the message to recover the simulated challenge and uses the challenge, the commitment, and a public key to validate the digital signature.

One type of user identification technique relies on the one-way property of the exponentiation function in the multiplicative group of a finite field or in the group of points on an elliptic curve defined over a finite field. This technique is described in U.S. Pat. No. 4,995,082 and in C. P. Schnorr, "Efficient Identification and Signatures for Smart Cards," in G. Brassard, ed., Advances in Cryptology—Crypto '89, Lecture Notes in Computer Science 435, Springer-Verlag, 1990, pp. 239–252. This technique involves the Prover exponentiating a fixed base element g of the group to some randomly selected power k and sending it to the verifier. An instance of the Schnorr technique uses two prime numbers p and q chosen at random such that q divides p−1, and a number g of order q modulo p is selected. The numbers p, q, and g are made available to all users. The private key of the Prover is x modulo q and the public key y of the Prover is $g^{-x}$ modulo p. The Prover initiates the identification process by selecting a random non-zero number z modulo q. The Prover computes the quantity gz modulo p and sends it as a commitment to the Verifier. The Verifies selects a random number w from the set of integers $\{1, 2, \ldots, 2^t\}$ where t is a security number which depends on the application and in the above-cited article is selected as 72. The Verifier sends w as a challenge to the Prover. The Prover computes a quantity u that is equal to the quantity z+xw modulo q as a response and sends it to the Verifier. The Verifier accepts the Prover as securely identified if gz is found to be congruent modulo p to the quantity $g^u y^z$.

Another type of user identification technique relies on the difficulty of factoring a product of two large prime numbers. A user identification technique of this type is described in L. C. Guillou and J. J. Quisquater, "A Practical Zero-Knowledge Protocol Fitted to Security Microprocessor Minimizing Both Transmission and Memory," in C. G. Gunther, Ed. Advances in Cryptology—Eurocrypt '88, Lecture Notes in Computer Science 330, Springer-Verlag, 1988, pp. 123–128. This technique involves a Prover raising a randomly selected argument g to a power b modulo n and sending it to a Verifier. An instance of the Guillou-Quisquater technique uses two prime numbers p and q selected at random, a number n generated as the product of p and q, and a large prime number b also selected at random. The numbers n and b are made available to all users. The private key of the Prover is x modulo n and the public key y of the Prover is $x^{-b}$ modulo n. The Prover initiates the identification process by randomly selecting the number g from the set of non-zero numbers modulo n. The Prover computes the quantity $g^b$ modulo n and sends it as a commitment to the Verifier. The Verifier randomly selects a number c from the set of non-zero numbers modulo b and sends c as a challenge to the Prover. The Prover computes the number h that is equal to the quantity $gx^c$ modulo n as a response and sends it to the Verifier. The Verifier accepts the Prover as securely identified if $g^b$ is found to be congruent modulo n to $h^b y^c$.

Although the above-described Schnorr and Guillou-Quisquater techniques can provide acceptable performance in many applications, there is a need for an improved technique which can provide greater computational efficiency than these and other prior art techniques, and which relies for security on features other than discrete logarithms and integer factorization.

SUMMARY OF THE INVENTION

The present invention provides a method, system and apparatus for performing user identification, digital signatures and other secure communication functions based on ring homomorphisms. The ring homomorphism in accordance with the invention may utilize two rings R and B, a ring homomorphism $\phi: R \to B$, and four subsets $R_f$, $R_g$, $R_h$, and $R_c$, of R. One element f in the set $R_f$ serves as a private key for a given user. The result $\phi(f)$ of evaluating the homomorphism $\phi$ at the element f serves as the public key of the given user.

Copending U.S. patent application Ser. No. 08/954,712, filed Oct. 20, 1997, and assigned, in joint ownership, to the same assignee as the present Application, discloses a user identification technique and digital signature technique based on partial evaluation of constrained polynomials over a finite field, and describes use of a response signal (such as in a commitment/challenge/response type of technique) that is generated by computing a polynomial as the product of a commitment polynomial with the sum of a private key and a challenge polynomial. The techniques hereof provide substantial improvements in computational efficiencies and lowering of processing requirements at equivalent security levels.

In accordance with one aspect of the invention, a secure user identification technique is provided in which one of the system users, referred to as a Prover, randomly selects an element g from the set $R_g$. The Prover evaluates the homomorphism ø at the element g and transmits the result ø(g) to another user referred to as the Verifier. The Verifier randomly selects a challenge element c from the set $R_c$. The Verifier transmits c to the Prover. The Prover generates a response element h using the private key f and the elements c and g. The element h may be generated in the form g*(f+c*g) using addition + and multiplication * in the ring R; or more generally by choosing a set of elements $g_i$, receiving a set of challenge elements $c_i$, creating modified challenge elements $d_i$ from the challenge elements $c_i$, transmitting the modified challenge elements $d_i$ to the Verifier, and generating the response element h as a polynomial function of the secret key f and the selected elements $g_i$, $c_i$, and $d_i$. The Verifier checks that the element h is in the set $R_h$. The Verifier also evaluates the homomorphism ø at the element h and compares the result ø(h) to a function of ø(g), ø(c), and the public key ø(f) of the Prover. For example, if the element h is generated in the form g*(f+c*g), then the verifier may check if the value ø(h) is equal to the value ø(g)*(ø(f)+ø(c)*ø(g)) using addition + and multiplication * in the ring B. If the element h is in the set $R_h$ and if the comparison of ø(h) to the function of ø(g), ø(c), and the public key ø(f) is correct, then the Verifier accepts the identity of the Prover. The Verifier may use the above-noted comparison for secure identification of the Prover, for authentication of data transmitted by the Prover, or for other secure communication functions.

In accordance with another aspect of the invention, a secure user identification technique is provided in which one of the system users, referred to as a Verifier, randomly selects a challenge element c from the set $R_c$. The Verifier transmits c to another user referred to as the Prover. The Prover randomly chooses an element g from the set $R_g$ and generates a response element h using the private key f and the elements c and g. The element h may be generated in the form g*(f+c*g) using addition + and multiplication * in the ring R; or more generally by generating the response element h as a polynomial function P(f,c,g) of the secret key f and the selected elements g and c. The Verifier checks that the element h is in the set $R_h$. The Verifier also evaluates the homomorphism ϕ at the element h and verifies that the polynomial equation P(ø(f),ø(c),X)−ø(h)=0 has a solution X in the ring B. For example, if the element h is generated in the form g*(f+c*g), then the verifier may check if the polynomial ø(c)X²+ø(f)X−ø(h)=0 has a solution in B by checking if the element ø(f)²+4ø(c)ø(h) is the square of an element in B. If the element h is in the set $R_h$ and if the polynomial equation P(ø(f),ø(c),X)−ø(h)=0 has a solution X in the ring B, then the Verifier accepts the identity of the Prover. The Verifier may use the above-noted comparison for secure identification of the Prover, for authentication of data transmitted by the Prover, or for other secure communication functions.

In accordance with another aspect of the invention, a digital signature technique is provided. A Prover randomly selects an element g from the set $R_g$. The Prover then computes ø(g) and applies a hash function to the element ø(g) and a message m to generate a challenge element c=Hash(ø(g),m) in the set $R_c$. The Prover utilizes g, c, and the private key f to generate an element h. The element h may be generated in the form g*(f+c*g) using addition + and multiplication * in the ring R, or more generally by choosing a set of polynomials $g_i$, generating a corresponding set of elements $c_i$ using the hash function, and generating the response element h as a polynomial function h=P(f,$c_i$,$g_i$). The Prover than transmits m, ø(g) and h to the Verifier. The Verifier checks that the element h is in the set $R_h$. The Verifier computes c=Hash(ø(g),m), evaluates ø(c) and ø(h), and compares the values of ø(g), ø(c), and ø(h) with the public key ø(f) of the Prover. For example, if the element h is generated in the form g*(f+c*g), then the verifier may check if the value ø(h) is equal to the value ø(g)*(ø(f)+(c)*ø(g)) using addition + and multiplication * in the ring B. If the element h is in the set $R_h$ and if the comparison of ø(h) to the function of ø(g), ø(c), and the public key ø(f) is correct, then the Verifier accepts the signature of the Prover on the message m.

In accordance with another aspect of the invention, a digital signature technique is provided. A Prover randomly selects an element g from the set $R_g$. The Prover then applies a hash function to a message m to generate a challenge element c=Hash(m) in the set $R_c$. The Prover utilizes g, c, and the private key f to generate an element h. The element h may be generated in the form g*(f+c*g) using addition + and multiplication * in the ring R; or more generally by generating the response element h as a polynomial function P(f,c,g) of the secret key f and the selected elements g and c. The Prover than transmits m and h to the Verifier. The Verifier checks that the element h is in the set $R_h$. The Verifier computes c=Hash(m), evaluates ø(c) and ø(h), and verifies that the polynomial equation ø(P)(ø(f),ø(c), X)−ø(h)=0 has a solution X in the ring B, where ø(P) is the polynomial P with the homomorphism øapplied to its coefficients. For example, if the element h is generated in the form g*(f+c*g), then the verifier may check if the polynomial ø(c)X²+ø(f)X−ø(h)=0 has a solution in B by checking if the element ø(f)²+4ø(c)ø(h) is the square of an element in B. If the element h is in the set $R_h$ and if the polynomial equation ø(P)(ø(f),ø(c),X)−ø(h)=0 has a solution X in the ring B, then the Verifier accepts the signature of the Prover on the message m.

The present invention provides a method, system and apparatus for performing user identification, digital signatures and other secure communication functions based more particularly on ring homomorphisms given by partial evaluation of constrained polynomials over a finite field. The ring R in accordance with the invention may utilize polynomials of degree less than N with coefficients in the field $F_q$ of q elements, where N divides q-1 and q is a power of a prime number. An exemplary predetermined condition on the subsets $R_f$, $R_g$ and $R_c$ of R may specify that the coefficients are chosen from a predetermined set of values such as, for example, the values 0, 1, and −1 in the field $F_q$, and an exemplary predetermined condition on the subset $R_h$ may specify that the coefficients are small, as for example the number q is a prime number, the coefficients of h are chosen between −q/2 and q/2, and the sum of the squares of the coefficients of h is smaller than $q^2$. A number of other conditions on the subsets $R_f$, $R_g$ and $R_c$ may be used in conjunction with or in place of these exemplary conditions.

The partial evaluation ring homomorphism in accordance with the invention may consist of a ring $B=F_q^s$ and a set of elements $a_1, \ldots, a_s$ in a public subset $S$ of $F_q$ and a homomorphism $\emptyset:R \to B$ corresponding to evaluation of a polynomial at the values in S according to the formula $\emptyset(p(X))=(p(a_1), p(a_2), \ldots, p(a_s))$. An exemplary condition on the ring R may specify that R is the ring of polynomials modulo the relation $X^N-1$ and an exemplary condition on the set of elements S may specify that each element $a_i$ in the set S satisfies the formula $a_i^N=1$. A number of other conditions on the ring R and on the set S may be used in conjunction with or in place of these exemplary conditions.

The use of ring homomorphisms, and more particularly ring homomorphisms given by partial evaluation of constrained polynomials over a finite field, in accordance with the invention provides user identification and digital signature techniques which are computationally more efficient than prior art techniques. The security of the techniques of the present invention depend on the fact that recovering an element of a ring from its value by a homomorphism, and more particularly recovering a polynomial from its partial evaluation, can, in certain circumstances, be a particularly difficult task.

Further features and advantages of the invention will become more readily apparent from the following detailed description when taken in conjunction with the accompanying drawings.

DETAILED DESCRIPTION

Figure 1:
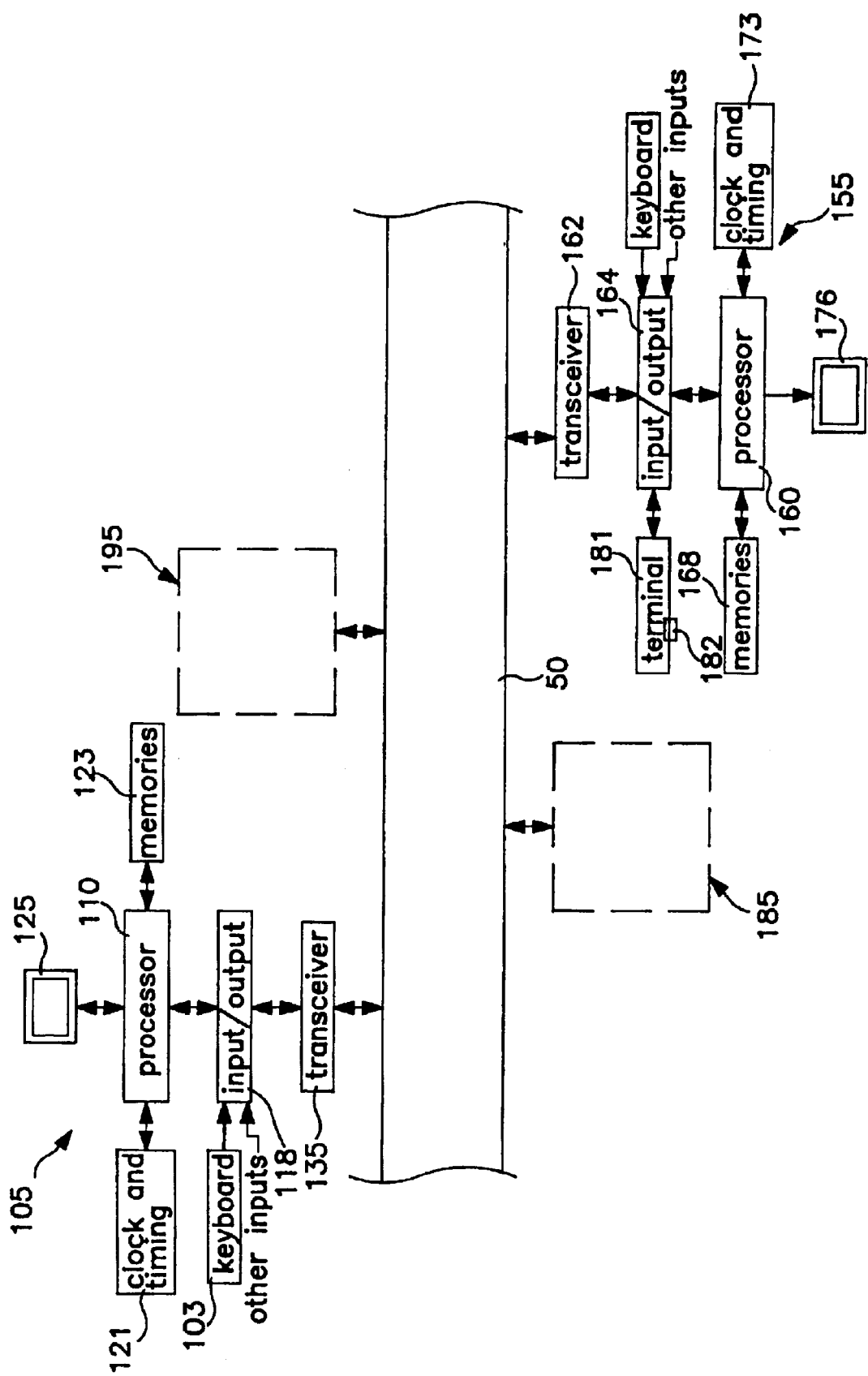
FIG. 1 is a block diagram of a type of system that can be used in practicing embodiments of the invention, for example when the processors thereof are suitably programmed in accordance with the flow diagrams hereof.

FIG. 1 is a block diagram of a system that can be used in practicing embodiments of the invention. A number of processor-based subsystems, represented at 105, 155, 185, and 195, are shown as being in communication over an insecure channel or network 50, which may be, for example, any wired, optical, and/or wireless communication channel such as a telephone or internet communication channel or network. The subsystem 105 includes processor 110 and the subsystem 155 includes processor 160. When programmed in the manner to be described, the processors 110 and 160 and their associated circuits can be used to practice embodiments of the invention. The processors 110 and 160 may each be any suitable processor, for example an electronic digital processor or microprocessor. It will be understood that any general purpose or special purpose processor, or other machine or circuitry that can perform the functions described herein, electronically, optically, or by other means, can be utilized. The processors may be, for example, Intel Pentium processors. The subsystem 105 may typically include memories 123, clock and timing circuitry 121, input/output functions 118, and monitor 125, which may all be of conventional types. Inputs can include a keyboard input as represented at 103 and any other suitable input. Communication is via transceiver 135, which may comprise a modem, high speed coupler, or any suitable device for communicating signals. The subsystem 155 in this illustrative system can have a similar configuration to that of subsystem 105. The processor 160 has associated input/output circuitry 164, memories 168, clock and timing circuitry 173, and a monitor 176. Inputs include a keyboard 163 and any other suitable input. Communication of subsystem 155 with the outside world is via transceiver 162 which, again, may comprise a modem, high speed coupler, or any suitable device for communicating signals. As represented in the subsystem 155, a terminal 181 can be provided for receiving a smart card 182 or other media. A "user" can also be a person's or entity's "smart card", the card and its owner typically communicating with a terminal in which the card is inserted. The terminal can be an intelligent terminal, or can communicate with an intelligent terminal. It will be understood that the processing and communications media that are described are exemplary, and that the invention can have application in many other settings. The blocks 185 and 195 represent further subsystems on the channel or network.

The present invention will be illustrated below in conjunction with exemplary user identification and digital signature techniques carried out by a Prover and a Verifier in a communication network such as that of FIG. 1 in which, for example, for a particular communication or transaction, any of the subsystems can serve either role. It should be understood, however, that the present invention is not limited to any particular type of application. For example, the invention may be applied to a variety of other user and data authentication applications. The term "user" may refer to both a user terminal as well as an individual using that terminal, and, as indicated above, the terminal maybe any type of computer or other digital data processor suitable for directing data communication operations. The term "Prover" as used herein is intended to include any user which initiates an identification, digital signature or other secure communication process. The term "Verifier" is intended to include any user which makes a determination as to whether a particular communication is legitimate. The term "user identification" is intended to include identification techniques of the challenge-response type as well as other types of identification, authentication and verification techniques.

The user identification and digital signature techniques in accordance with the present invention are based on evaluation of ring homomorphisms. An exemplary embodiment of the present invention is based on the partial evaluation homomorphism of constrained polynomials over a finite field. An exemplary finite field $F_q=Z/qZ$ is defined for a prime number q. An exemplary ring $R=F_q[X]/(X^{q-1}-1)$ is a ring of polynomials with coefficients in the finite field $F_q$ modulo the ideal generated by the polynomial $X^{q-1}-1$. An exemplary homomorphism $\emptyset:R \to F_q^s$ is a homomorphism $\emptyset(f(X))=(f(a_1), \ldots, f(a_s))$ for an ordered set $S=\{a_1, \ldots, a_s\}$ of non-zero integers modulo q. An additional exemplary condition is that if a is in S, then $a^{-1}$ is also in S. With suitable restrictions on f(X) and a suitable choice of set S, it is infeasible to recover f(X) when given only $\emptyset(f(X))$. As will be described in greater detail below, this provides a one-way function which is particularly well-suited to use in implementing efficient user identification and digital signatures.

The identification and digital signature techniques make use of the multiplication rule in the ring R. Given a polynomial $A(X)=A_0+A_1X+\ldots+A_{q-2}X^{q-2}$ in R and a polynomial $B(X)=B_0+B_1X+\ldots+B_{q-2}X^{q-2}$ in R, an exemplary product may be given by:

$$C(X)=A(X)B(X=C_0+C_1X+\ldots+C_{q-2}X^{q-2}$$

where $C_0, \ldots, C_{q-2}$ are given by:

$$C_i=A_0B_i+A_1B_{i-1}+\ldots A_iB_0A_{i+1}B_{q-2}B_{q-3}+\ldots+A_{q-2}B_{i+1}(\text{modulo } q).$$

All reference to multiplication of polynomials in the remaining description should be understood to refer to the above-described exemplary multiplication in R. It should also be noted that the above-described multiplication rule is not a requirement of the invention, and alternative embodiments may use other types of multiplication rules.

Figure 2:
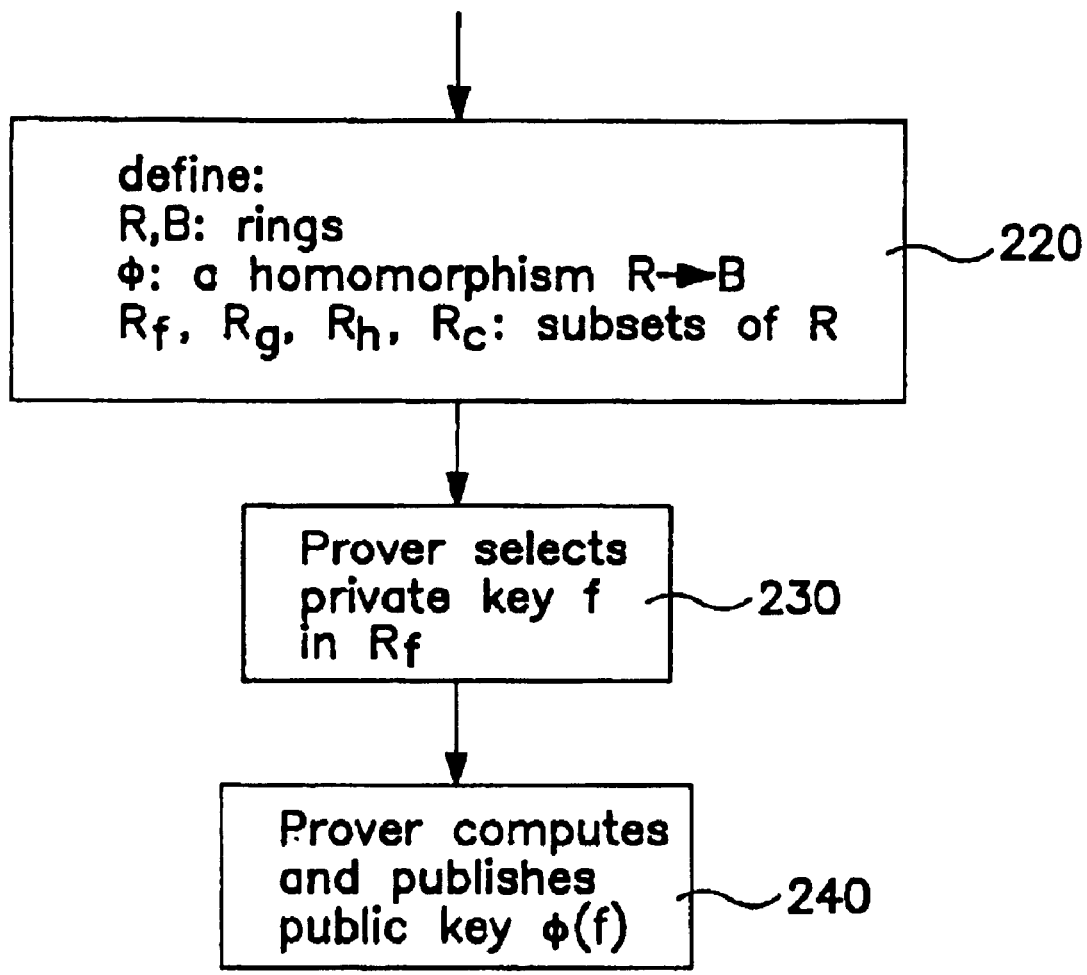
FIG. 2 is a flow diagram which illustrates a key creation technique in accordance with an exemplary embodiment of the present invention.

An exemplary set of constrained polynomials $R_f$ is the set of polynomials in R with bounded coefficients. Given the prime number q and the polynomial f(X), it is relatively easy to generate $\phi(f)=(f(a_1), \ldots, f(a_t))$. However, appropriately selected restrictions on the polynomials in $R_f$ can make it extremely difficult to invert this function to determine a polynomial F(X) in $R_f$ such that $\phi(F)=\phi(f)$. The difficulty of the inversion is generally dependent on the type of restrictions placed on the polynomials in $R_f$. For example, if easily satisfied restrictions are placed on the polynomials, basic interpolation techniques could be used to find some polynomial F(X) in $R_f$ such that $\phi(F)=\phi(f)$. It will be shown in greater detail below that establishing appropriate restrictions on the polynomials in $R_f$ can provide adequate levels of security. An exemplary identification technique in accordance with the invention uses a number of system parameters which are established by a central authority and made public to all users. These system parameters include the above-noted prime number q and set $S=\{a_1,\ldots,a_t\}$ of t non-zero elements of the finite field $F_q$ and appropriate sets of bounded coefficient polynomials $R_f, R_g, R_c$. FIG. 2 illustrates the creation of a public/private key pair. After establishment of parameters (block 220) a Prover randomly chooses a secret polynomial f(X) in $R_f$ as its private key (block 230). The public key of the Prover is then generated as $\phi(f)=(f(a_1), \ldots, f(a_t))$ which represents the ordered evaluation of the secret polynomial f(X) at the t elements of S, and the public key can be published (block 240).

Figure 3:
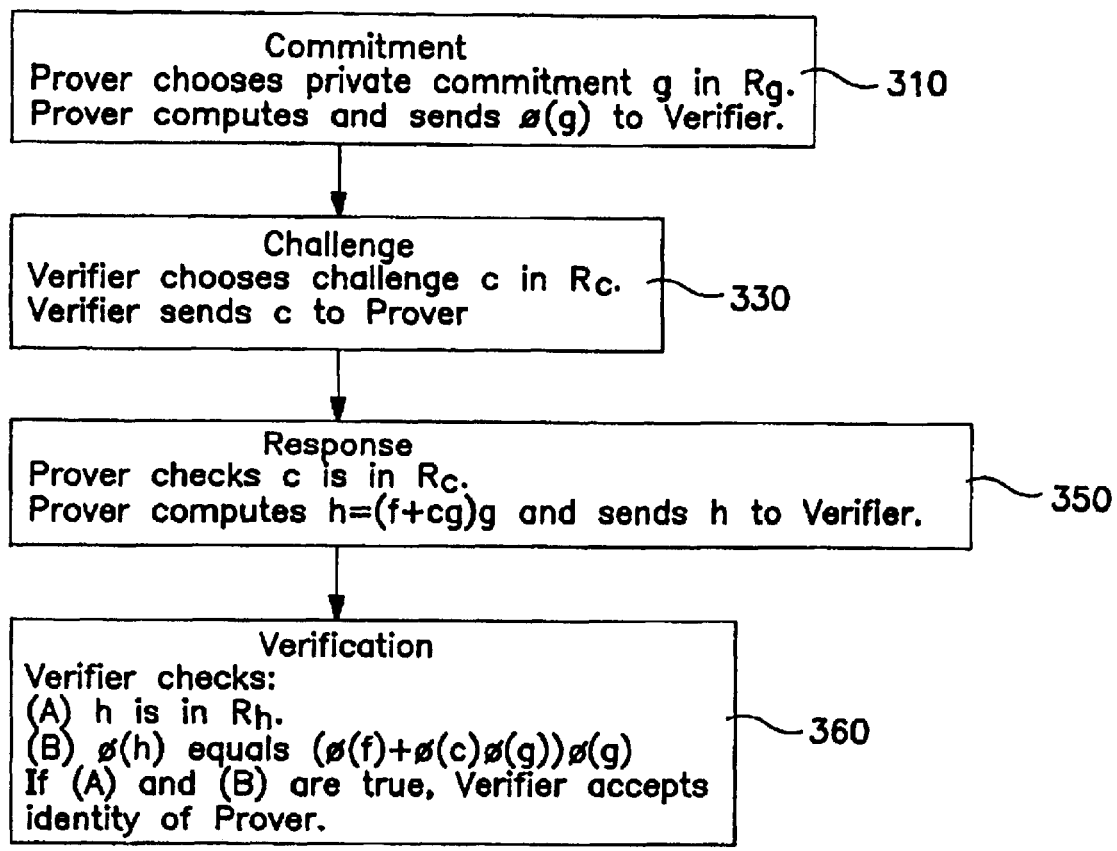
FIG. 3 is a flow diagram which illustrates a user identification technique in accordance with an exemplary embodiment of the present invention.

FIG. 3 illustrates an exemplary identification process. The identification process is initiated in the Commitment Phase (block 310) by the Prover generating a polynomial g(X) with bounded coefficients. The polynomial g(X) may be selected at random from a set $R_g$ that is restricted in a manner to be described below. The Prover uses the polynomial g(X) and the public set of values $S=\{a_1, \ldots, a_t\}$ to compute a commitment $\phi(g)=(g(a_1), \ldots, g(a_t))$ and sends the commitment to the Verifier.

The Verifier initiates the Challenge Phase (block 330) by generating a challenge polynomial c(X) with bounded coefficients and sending it to the Prover. The polynomial c(X) may be generated by random selection from a set of polynomials $R_c$ that is restricted in a manner to be described below. The Prover initiates the Response Phase (block 350) by verifying that the challenge polynomial c(X) is in the restricted set of polynomials $R_c$ and then using the polynomials c(X),g(X) and the secret polynomial f(X) to generate the response polynomial h(X) given by $$h(X)=g(X)(f(X)+c(X)g(X))$$

and sending the response polynomial h(X) to the Verifier. The Verifier initiates the Verification Phase (block 360) by using its knowledge of $\phi(g)$, c(X), and the public key $\phi(f)$ to check that the response polynomial h(X) was generated using the private key f(X) of the Prover by comparing:

$$h(a_1) \text{ to } g(a_j)(f(a_1)+c(a_i)g(a_j)) \text{ for } i=1,2,\ldots,t.$$

This check may be expressed as comparing whether $\phi(h)$ is equal to $\phi(g)(\phi(f)+\phi(c)\phi(g))$. The Verifier in the Verification Phase also checks whether or not the coefficients of h(X) are appropriately bounded, given that a legitimate h(X) will have bounded coefficients and will belong to a restricted set $R_h$ of polynomials. The restrictions on the set $R_h$ depend on the choice of the above noted sets $R_f, R_g$ and $R_c$. The Verifier accepts the Prover as legitimate if the response polynomial h(X) transmitted by the Prover passes the checks of steps (A) and (B) of the Verification Phase. The Verifier may perform a number of other checks as part of the identification process. For example, prior to performing steps (A) and (B) of the Verification Phase, the Verifier may check that g(1), provided by the Prover as an element of the commitment $\phi(g)$, has a particular expected value.

A first exemplary set of system parameters suitable for use with the above-described identification technique will now be described. It should be emphasized that these and other exemplary parameters described herein are illustrative only and that numerous alternative sets of parameters could also be used. In the first exemplary set of parameters, the prime number q is selected as 769, and the set S includes t=384 non-zero integers modulo q. The set S is constructed such that if a is an element of S, then $a^{-1}$ is also an element of S. It should be noted that a given implementation may utilize only a subset of the t elements of S. The set $R_f$ is the set of all polynomials f(X) of degree less than 768 constructed with 51 coefficients of value 1, with 51 coefficients of value −1, and all other coefficients set to zero. The set $R_g$ is the set of all polynomials g(X) of degree less than 768 constructed with 51 coefficients of value 1, with 51 coefficients of value −1, and all other coefficients set to zero. The set $R_c$ is the set of all polynomials c(X) of degree less than 768 constructed with 5 coefficients of value 1, with 5 coefficients of value −1, and all other coefficients set to zero. Finally, the set $R_h$ is the set of polynomials $h(X)=h_0+h_1X+\ldots+h_{767}X^{767}$ of degree less than 768 whose coefficients are between −384 and 384 and which satisfy the inequality $h_0^2+h_1^2+\ldots+h_{767}^2<769^2=591361$. The user identification technique described in conjunction with FIG. 3 above is then implemented using polynomials selected from the sets $R_f, R_g, R_c$ and $R_h$.

Alternative embodiments of the invention may utilize several private key polynomials $f_1, \ldots f_n$, several commitment polynomials $g_1, \ldots g_r$ and several challenge polynomials $c_1, \ldots, c_s$ and may further utilize other functions of the key polynomials, commitment polynomials, and challenge polynomials to generate several response polynomials $h_1, \ldots h_u$. For example, $h_i$, could be generated as the value $$h_i=P_i(f_1,\ldots,f_n,g_1,\ldots,g_r,c_1,\ldots,c_s)$$

for polynomials $P_i(U_1, \ldots, f_n, g_1, \ldots, g_r, c_1, \ldots, c_s)$ with coefficients in R. The Verification Phase then consists of the two verification steps: (A) verify that h is in the set $R_h$; and (B) verify that the value $\phi(h_i)$ is equal to the value $$\phi(P_i)(\phi(f_1), \ldots, \phi(f_n)\phi(g_1), \ldots \phi(g_r), \phi(c_1), \ldots, \phi(c_s)) \text{ for } i=1,2,\ldots, u,$$

where $\phi(P_i)$ is the polynomial $P_i$ with the homomorphism $\phi$ applied to its coefficients.

Figure 4:
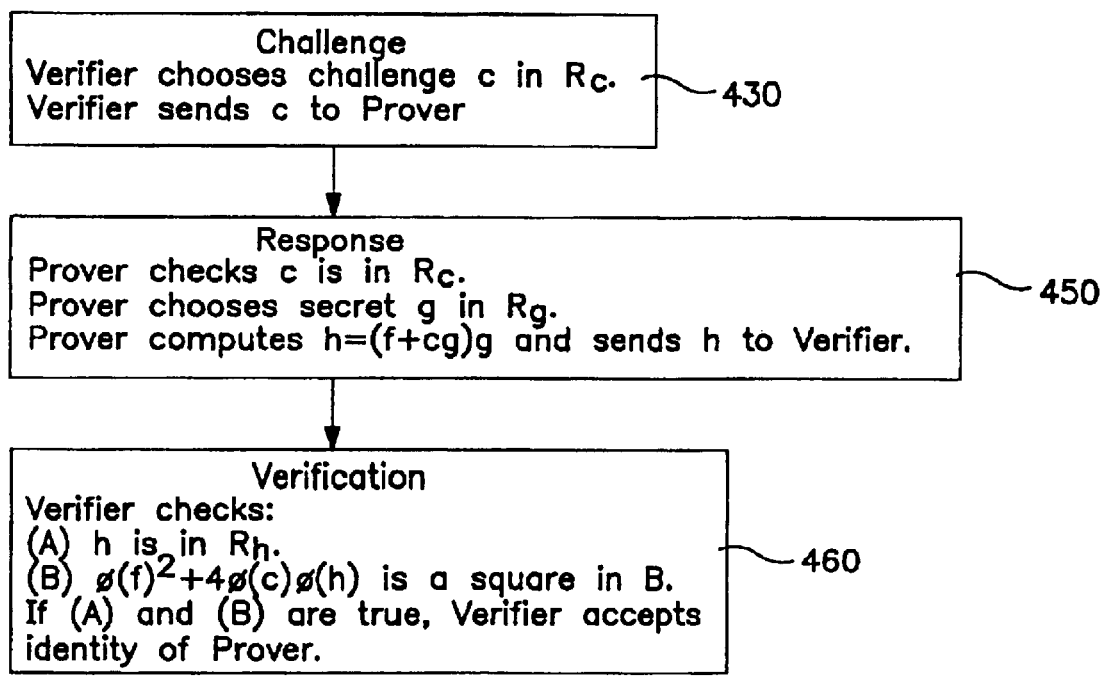
FIG. 4 is a flow diagram which illustrates a further user identification technique in accordance with another exemplary embodiment of the present invention.

A second exemplary identification technique in accordance with the invention uses the same systems parameters and public/private key pairs as described above. FIG. 4 illustrates the second exemplary identification process. The identification process is initiated in the Challenge Phase (block 430) by the Verifier generating a challenge polynomial c(X) with bounded coefficients and sending it to the Prover. The polynomial c(X) may be generated by random selection from a set of polynomials $R_c$ as described above. The Prover initiates the Response Phase (block 450) by verifying that the challenge polynomial c(X) is in the restricted set of polynomials $R_c$ and then generating a polynomial g(X) with bounded coefficients, where the polynomial g(X) may be selected at random from a set $R_g$ as described above. The Prover uses the polynomials c(X),g(X) and the secret polynomial f(X) to generate the response polynomial h(X) given by $$h(X)=g(X)(f(X)+c(X)g(X))$$

and sending the response polynomial h(X) to the Verifier. The Verifier initiates the Verification Phase (block 460) by using its knowledge of c(X), and the public key (f) to check that the response polynomial h(X) was generated using the private key f(X) of the Prover by verifying that:

$$f(a_i)^2+4c(a_i)h(a_i) \text{ equals a square modulo q for } i=1,2,\ldots,t.$$

This check my be expressed as verifying that $\phi(f)^2+4\phi(c)\phi(h)$ is equal to a square in the ring B. The Verifier in the Verification Phase also checks whether or not the coefficients of h(X) are appropriately bounded, given that a legitimate h(X) will have bounded coefficients and will belong to a restricted set $R_h$ of polynomials. The restrictions on the set $R_h$ depend on the choice of the above noted sets $R_f, R_g$ and $R_c$. The Verifier accepts the Prover as legitimate if the response polynomial h(X) transmitted by the Prover passes the checks of steps (A) and (B) of the Verification Phase.

A second exemplary set of system parameters suitable for use with the above-described identification technique will now be described. In the second exemplary set of parameters, the prime number q is selected as 641, and the set S includes t=320 non-zero integers modulo q. The set S is constructed such that if a is an element of S, then $a^{-1}$ is also an element of S. It should be noted that a given implementation may utilize only a subset of the t elements of S. The set $R_f$ is the set of all polynomials f(X) of degree less than 640 constructed with 214 coefficients of value 1, with 214 coefficients of value −1, and all other coefficients set to zero. The set $R_g$ is the set of all polynomials g(X) of degree less than 640 constructed with 43 coefficients of value I, with 43 coefficients of value −1, and all other coefficients set to zero. The set $R_c$ is the set of all polynomials c(X) of degree less than 640 constructed with 5 coefficients of value 1, with 5 coefficients of value −1, and all other coefficients set to zero. Finally, the set $R_h$ is the set of polynomials $h(X)=h_0+h_1X+\ldots+h_{767}X^{767}$ of degree less than 640 whose coefficients are between −320 and 320 and which satisfy the inequality $h_0^2+h_1^2+\ldots+h_{767}^2<641^2=410881$. The user identification technique described in conjunction with FIG. 4 above is then implemented using polynomials selected from the sets $R_f, R_g, R_c$ and $R_h$.

Figure 5:
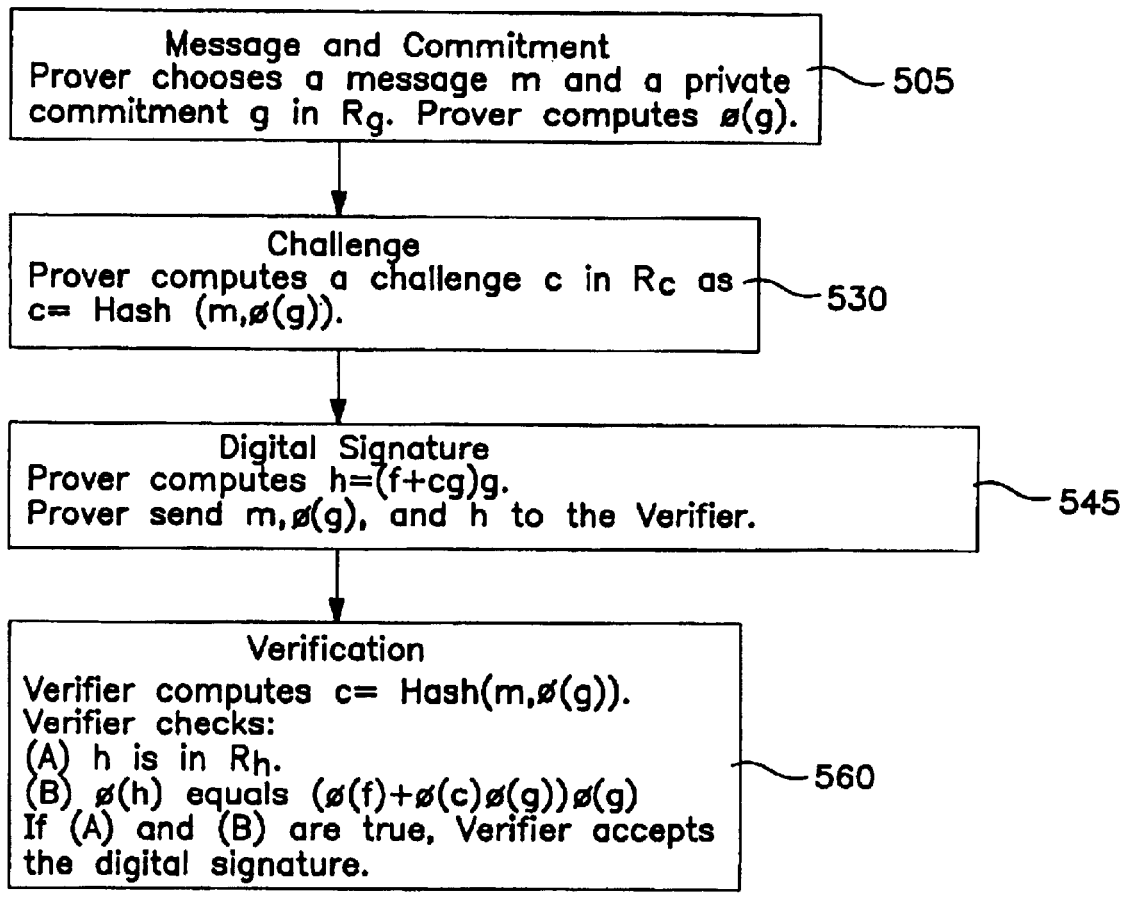
FIG. 5 is a flow diagram which illustrates a digital signature technique in accordance with an exemplary embodiment of the present invention.

FIG. 5 illustrates the operation of an exemplary digital signature technique implemented using the above-described ring homomorphism method. In a digital signature technique, the Prover generates a simulated challenge polynomial by applying a one-way hash function to a message m and a commitment ø(g). The one-way hash function is also available to the Verifier and will be used to validate the digital signature. As shown in FIG. 5, in the Message and Commitment Phase (block 505), the Prover generates a polynomial g(X) in the set $R_g$ as previously described and uses g(X) to generate the commitment ø(g). The Prover also selects a message m to be signed. In the Challenge Phase (block 530) the Prover computes a challenge polynomial c(X) by applying a hash function Hash(o,o) such that c(X) is generated as Hash(m,ø(g)). The message m and commitment ø(g) are suitably formatted as an input to the function Hash(o,o) and the output c(X) of Hash(o,o) maps uniformly onto the set $R_c$. In the Digital Signature Phase (block 545) the Prover computes a response polynomial as in the above-described user identification embodiments. For example, h(X) may be computed as g(X)(f(X)+c(X)g(X)). The Prover then sends the message m to the Verifier, along with the pair (ø(g),h(X)) as a digital signature on the message m. In the Verification Phase of (block 560), the Verifier uses the one-way hash function to compute c(X)=Hash(m,ø(g)). The Verifier accepts the signature as valid if h(X) is within in the set $R_h$ and if ø(h) is equal to ø(g)(ø(f)+ø(c)ø(g)). As in the identification embodiments, alternative embodiments may use several private keys, several commitments, several challenges, and different functions to generate the response.

Figure 6:
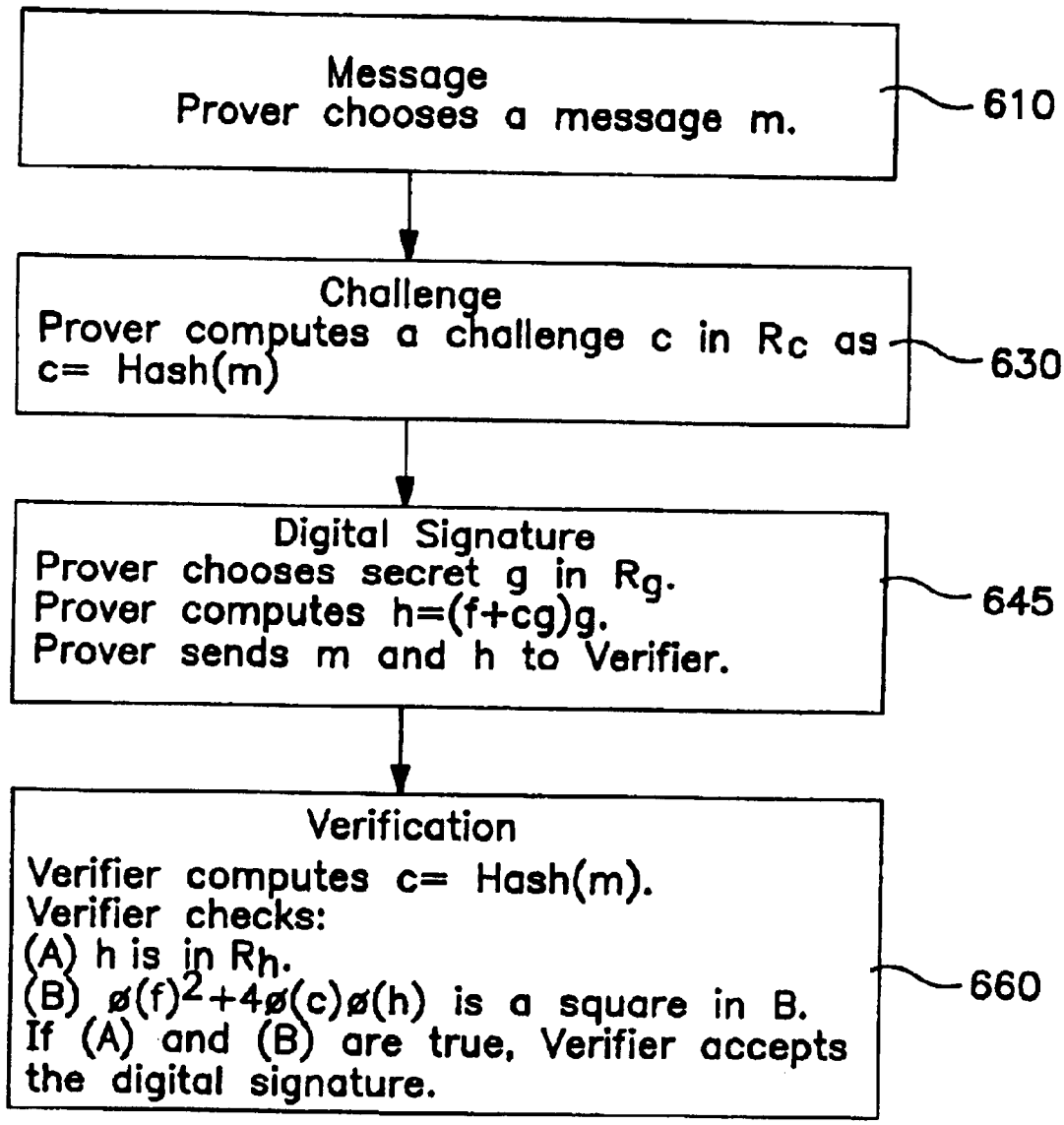
FIG. 6 is a flow diagram which illustrates a further digital signature technique in accordance with another exemplary embodiment of the present invention.

FIG. 6 illustrates the operation of a second exemplary digital signature technique implemented using the above-described ring homomorphism method. In a digital signature technique, the Prover generates a simulated challenge polynomial by applying a one-way hash function to a message m. The one-way hash function is also available to the Verifier and will be used to validate the digital signature. As shown in the Message Phase (block 610), the Prover selects a message m to be signed. In the Challenge Phase (block 630), the Prover computes a challenge polynomial c(X) by applying a hash function Hash(o) such that c(X) is generated as Hash(m). The message m is suitably formatted as an input to the function Hash(o) and the output c(X) of Hash(o) maps uniformly onto the set $R_c$. In the Digital Signature Phase (block 654), the Prover randomly selects a polynomial g(X) from the set $R_g$ and computes a response polynomial as in the above-described user identification embodiments. For example, h(X) may be computed as g(X)(f(X)+c(X)g(X)). The Prover then sends the message m to the Verifier, along with the polynomial h(X) as a digital signature on the message m. In the Verification r Phase (block 660), the Verifier uses the one-way hash function to compute c(X))=Hash(m). The Verifier accepts the signature as valid if h(X) is within in the set $R_h$ and if the quantity $(f)^2+4\phi(c)\phi(h)$ is a square in B. As in the identification embodiments, alternative embodiments may use several private keys, several commitments, several challenges, and different functions to generate the response.

Examples of operation of embodiments hereof will be provided below using very small numbers. These examples are not cryptographically secure and are meant only to illustrate the process. For further detail, see Appendix I (published as J. Hofffstein, D. Lieman, J. H. Silverman, Polynomial Rings and Effect Public Key Authentication, in Proceeding of the International Workshop on Cryptographic Techniques and E-Commerce (CrypTEC '99),Hong Kong, (M. Blum and C. H. Lee, eds.), City University of Hong Kong Press) and Appendix II (J. Hoffstein, J. H. Slverman, Polynomial Rings and Efficient Public Key Authentication II, CCNT '99 Proceedings, to appear.) The technique is called "PASS" (for Polynomial Authentication And Signature Scheme), and has a variation called PASS2.

The numbers used by PASS are integers modulo q. This means that each integer is divided by q and replaced by its remainder. For example, if q=7, then the number 39 would be replaced by 4, since 39 divided by 7 equals 5 with a remainder of 4.

The objects used by PASS are polynomials of degree N−1

$$a_0+a_1x+a_2x^2+\ldots+a_{N-1}x^{N-1},$$

where the coefficients $a_0,\ldots,a_{N-1}$ are integers modulo q. (It is sometimes more convenient to represent a polynomial by an N-tuple of numbers $[a_0,a_1,\ldots,a_{N-1}]$. In this situation the star product becomes a convolution product Convolution products can be computed very efficiently using Fast Fourier Transforms.) PASS uses a special kind of multiplication where $x^N$ is replaced by 1, and $x^{N+1}$ is replaced by x, and $x^{N+2}$ is replaced by $x^2$, and so on (In mathematical terms, this version of PASS uses the ring of polynomials with mod q coefficients modulo the ideal consisting of all multiples of the polynomial $x^{N-1}$. More generally, one could use polynomials modulo a different ideal; and even more generally, one could use some other ring. The basic definitions and properties of rings and ideals can be found, for example, in *Topics in Algebra*, I. N. Herstein, Xerox College Publishing, Lexington, Mass., 2$^{nd}$ edition, 1975.) A * will be used to indicate this special polynomial multiplication.

Here is a sample multiplication using N=6:

$$(5+x+2x^3+3x^5)*(3+x^2+2x^3+4x^4+x^5)$$
$$=15+3x+5x^2+17x^3+25x^4+20x^5+6x^6+$$
$$13x^7+12x^8+13x^9+3x^{10}\text{ (use the rule}$$
$$x^6=1,\ x^7=x,\ x^8=x^2,\ x^9=x^3,\ x^{10}=x^4)$$
$$=21+16x+17x^2+30x^3+28x^4+20x^5$$
(reduce the coefficients modulo 7)
$$=2x+3x^2+2x^3+6x^5$$

Polynomials whose coefficients consist entirely of 0's and 1's play a special role in PASS. (In some versions, one also allows coefficients to equal −1.) These polynomials with only 0's and 1's as coefficients are called binary polynomials. For example, $$1+x^2+x^3+x^5$$

is a binary polynomial. In practice one may also want to specify how many 1's are allowed.

The PASS2 authentication scheme is next described, using a small numerical example.

PASS2 Parameters

The first step is to choose a prime number q and to take N=q−1. For this example, take q=7 and N=6.

One also needs to choose a set S consisting of half of the numbers between 1 and q−1, so for our example, half of the numbers between 1 and 6. Take the set

S={2, 4, 6}.

(There is one other condition on the set S. This condition says that if b is in S, then S must also contain the number c that satisfies the equation bc=1 (modulo q). In our example, 2*4=1 (modulo 7) and 6*6=1 (modulo 7), so the set S={2, 4,6} has the required property.) Finally, one needs to specify two numbers $A_h$ and $B_h$ that will be used in the verification process. For this example, take $A_h$=5 and $B_h$=22.

PASS2 Key Creation

The key creator Bob chooses a binary polynomial f(x) of degree less than N. This means that f(x) has only 0's and 1's as its coefficients. For example, Bob might choose the polynomial $$f(x)=1+x^2+x^3+x^5.$$

The polynomial f(x) is his private key, so he must keep it secret.

Next Bob computes the values of f(x) modulo q for the numbers in S. In this example the set S is S {2, 4, 6}, so Bob computes $f(2)=1+4+8+32=45=3$ (modulo 7)

$f(4)=1+16+64+1024=1105=6$ (modulo 7)

$f(6)=1+36+216+7776=8029=0$ (modulo 7).

This set of values $f(S)=\{3,6,0\}$ is Bob's public key. He publishes it so that people can use it to verify his identity.

PASS2 Commitment Step

The first step in the PASS2 authentication process is for Bob to make a Commitment and send it to Alice. He does this by choosing a binary polynomial $g_1(x)$ and computing the set of values $g_1(S)$, in much the same way that he chose f(x) and computed the values of f(x). He keeps the polynomial $g_1(x)$ secret, but he sends the set of values $g_1(S)$ to Alice as his Commitment.

For our example we will suppose that Bob chooses the polynomial $$g_1(x)\ x+x^3+x^4+x^5.$$

He computes the values $g_1(2)=58=2$ (modulo 7)

$g_1(4)=1348=4$ (modulo 7)

$g_1(6)=9294=5$ (modulo 7)

and sends the set of values $g_1(S)=\{g_1(2),g_1(4),g_1(6)\}=\{2,4,5\}$ to Alice as his Commitment.

PASS2 Challenge Step

The second step in the PASS2 authentication process is for Alice to send a Challenge to Bob. Alice's challenge consists of two binary polynomials $c_1(x)$ and $c_2(x)$, possibly satisfying some additional conditions. (The principal extra condition is that the polynomials $c_1(x)$ should not vanish modulo q for all nonzero values of x not in the set S. In this example, we have $c_1(x)=X^5+x^3$, and the values of $c_1(x)$ at nonzero numbers not in S are $c_1(1)=2$ (modulo 7), $c_1(3)=4$ (modulo 7), and $c_1(5)=2$ (modulo 7).) For our example we suppose that Alice chooses the polynomials $$c_1(x)=x^3+x^5\text{ and }c_2(x)=x+x^2.$$

Alice sends the two challenge polynomials $c_1$ and $c_2$ to Bob.

PASS2 Response Step

The third step in the PASS2 authentication process is for Bob to use his private key $f(x)$, his commitment polynomial $g_1(x)$, and Alice's challenge polynomials $c_1(x)$ and $c_2(x)$ to create his Response. He does this by choosing another binary polynomial $g_2(x)$ and computing the polynomial $$h(x)=(f(x)+c_1(x)*g_1(x)+c_2(x)*g_2(x)*g_2(x).$$

Note that this computation is done using star multiplication (i.e., with $X^N=1$) and that the coefficients are always computed modulo q. Bob sends the polynomial $h(x)$ to Alice as his Response. He does not reveal the polynomial $g_2(x)$, and indeed he may discard it as soon as he has computed $h(x)$.

Suppose that in our example Bob chooses the polynomial $$g_2(x)=1+x+x^5.$$

Then $$h(x) = ((1 + x^2 + x^3 + x^5) + (x^3 + x^5)*(x + x^3 + x^4 + x^5) +$$
$$(x + x^2)*(1 + x + x^5))*(1 + x + x^5)$$
$$= 1 + 5x + 4x^2 + 3x^3 + 6x^4 \text{ (modulo 7, with the rule } x^6 = 1).$$

PASS2 Verification Step

The fourth and final step in the PASS2 authentication process is for Alice to use Bob's public key $f(S)$, Bob's commitment $g(S)$, and her challenge polynomials $c_1(x)$ and $c_2(x)$ to verify that Bob's response is a valid response. This Verification consists of two parts.

[A] Recall that the PASS2 parameters included two numbers $A_h$ and $B_h$. Alice writes the polynomial $h(x)$ as $h_0+h_1x+h_2x^2+\ldots+h_{N-1}x^{N-1}$ with coefficients $h_0,h_1,\ldots,h_{N-1}$ taken modulo q and lying as close as possible to the number $Ah$. She then computes the quantity $$C=(h_0-A_h)^2+(h_1-A_h)^2+(h_2-Ah)^2+\ldots+(h_{N-1}-A_H)^2.$$

She compares the number C to the number $B_h$. If C is smaller than $B_h$, then Bob's response passes the first test. If C is larger than $B_h$, then Bob's response fails the first test.

[B] For each number b in the set S, Alice computes the number $$(f(b)+c_1(b)g_1(b))^2+4c(b)h(b) \text{ modulo q}.$$

(Note that Alice possesses enough information to compute this number, since she knows the polynomials $c_1(x)$, $c_2(x)$, and $h(x)$ and she knows the values of $f(b)$ and $g_1(b)$ for every number b in the set S.) Alice checks if this number is equal to the square of a number modulo q. If it is equal to a square modulo q for every number b in the set S, then Bob's response passes the second test. If it fails to be a square for even a single number in the set S, then Bob's response fails the second test.

In the present example, this works as follows. The example quantities are $A_h=5$ and $B_h=22$, and the response polynomial is $h(x)=1+5x+4x^2+3x^3+6x^4$. For the first verification test, which is test [A], Alice writes $h(x)$ using coefficients modulo 7 that are as close as possible to 5; in other words, she uses the numbers 2,3,4,5,6,7,8 as coefficients of $h(x)$, which means she writes $h(x)$ as $$h(x)=8+5x+4x^2+3x^3+6x^4+7x^5.$$

Alice then computes $$(8-5)^2+(5-5)^2+(3-5)^2+(3-5)^2+(6-5)^2+(7-5)^2=19.$$

This value is smaller than 22 (i.e., it is smaller than $B_h$), so Bob's response passes the first verification test.

For the second verification test, which is test [B], Alice uses the known quantities $$\{f(2), f(4), f(6)\}=\{4, 3, 0\}$$

$$\{g_1(2), g_1(4), g_1(6)\}=\{4, 2, 4\}$$

$$c_1(x)=x^3+x^5, \text{ so } \{c(2), c_1(4), c_1(6)\}=\{2, 5, 4\}$$

$$c_2(x)=x+x^2, \text{ so } \{c_2(2), c_2(4), c_2(6)\}=\{2, 6, 5\}$$

$$h(x)=1+5x+4x^2+3x^3+6x^4, \text{ so } \{h(2), h(4), h(6)\}=\{5, 0, 3\}$$

These values let her compute $$(f(2)+c_1(2)g_1(2))^2+4c_2(2)h(2)=2 \text{ (modulo 7)}$$

$$(f(4)+c_1(4)g_1(4))^2+4c_2(4)h(4)=1 \text{ (modulo 7)}$$

$$(f(6)+c_1(6)g_1(6))^2+4c_2(6)h(6)=1 \text{ (modulo 7)}$$

Each of these numbers is a square modulo 7, since $$1=1^2 \text{ and } 2=3^2 \text{ (modulo 7)}.$$

(The numbers 0, 1, 2, and 4 are squares modulo 7, and the numbers 3, 5, and 6 are not squares modulo 7.) Bob's response passes the second verification test. Since it has now passed both tests [A] and [B], Alice accepts that Bob has proven his identity.

Any authentication scheme involving the steps of

Commitment/Challenge/Response/Verification can be turned into a digital signature scheme. The basic idea is to use a hash function (see below) to create the challenge from the commitment and the digital document to be signed. The steps that go into a PASS2 Digital Signature are as follows.

PASS2 Key Creation (Digital Signature)

Same as for PASS2 Authentication: Bob creates his private key $f(x)$ and his public key consisting of the partial set of values $f(S)$.

PASS2 Commitment Step (Digital Signature)

Same as for PASS2 Authentication: Bob chooses a polynomial $g_1(x)$ and computes the partial set of values $g_1(S)$ to serve as his commitment.

PASS2 Challenge Step (Digital Signature)

Bob takes his commitment $g_1(S)$ and the digital document D that he wants to sign and runs them through a hash function H (see below) to produce challenge polynomials $c_1(x)$ and $c_2(x)$.

PASS2 Response Step (Digital Signature)

Same as for PASS2 Authentication: Bob uses his private key $f(x)$, the polynomial $g_1(x)$, another polynomial $g_2(x)$, and the challenge polynomials $c_1(x)$ and $c_2(x)$ to compute the response polynomial $h(x)=f(x)+c_1(x)*g_1(x)+c_2(x)*g_2(x))*g_2(x)$. Bob publishes the D, $g_1(S)$, and $h(x)$. The quantities $g_1(S)$ and $h(x)$ are his digital signature for the digital document D.

PASS2 Verification Step (Digital Signature)

When Alice wants to check Bob's digital signature on the digital document D, she begins by running $g_1(S)$ and D through the hash function H to reproduce the challenge polynomials $c_1(x)$ and $c_2(x)$. She now has all of the information needed to verify that $h(x)$ is a valid response for the public key f(S), the commitment $g_1(S)$, and the challenge $c_1(x)$ and $c_2(x)$. If h(x) is a valid response, she accepts Bob's signature on the document D.

Notice how Bob's signature is inextricably tied to the digital document D. If even one bit of D is changed or if one bit of the commitment $g_1(S)$ is changed, then the hash function will produce different challenge polynomials $c_1(x)$ and $c_2(x)$, so the verification step will fail and the signature will be rejected.

Hash functions, which are well known in the art, are used herein. The purpose of a hash function is to take an arbitrary amount of data as input and produce as output a small amount of data (typically between 80 and 160 bits) in such a way that it is very hard to predict from the input exactly what the output will be. For example, it should be extremely difficult to find two different sets of inputs that produce the exact same output. Hash functions are used for a variety of purposes in cryptography and other areas of computer science.

It is a nontrivial problem to construct good hash functions. Typical hash function such as SHA1 and RD5 proceed by taking a chunk of the input, breaking it into pieces, and doing various simple logical operations (e.g., and, or, shift) with the pieces. This is generally done many times. For example, SHA1 takes as input 512 bits of data, it does 80 rounds of breaking apart and recombining, and it returns 160 bits to the user. This process can be repeated for longer messages.

The PASS2 scheme described above is a variation of an earlier version of PASS. Both schemes have the same level of security, but the operating characteristics (key sizes, communication requirements, etc.) of PASS are not as good as those of PASS2. Next, PASS is demonstrated with a small numerical example, to illustrate the similarities and differences between the two systems. The fundamental similarity is that the security depends on the difficulty of reproducing a binary polynomial from a partial set of its values.

PASS Parameters

PASS and PASS2 use the same parameters q, N (with N=q-1), a set of numbers S, and two quantities $A_h$ and $B_h$, although the actual values of these parameters may differ.
Example:

$$q=7, N=6, S=\{2,4,6\}, A_h=5, B_h=9.$$

PASS Key Creation

Bob chooses two binary polynomials $f_1(x)$ and $f_2(x)$ as his private key. The partial sets of values $f_1(S)$ and $f_2(S)$ form his public key.
Example:

$$f_1(x) = x^4 + 1 \quad f_1(S) = \{f_1(2), f_1(4), f_1(6)\} = \{3, 5, 2\}$$

$$f_2(x) = x^5 + x \quad f_2(S) = \{f_2(2), f_2(4), f_2(6)\} = \{6, 6, 5\}$$

PASS Commitment Step

Bob chooses two binary polynomials $g_1(x)$ and $g_2(x)$. He computes and sends to Alice the partial sets of values $g_1(S)$ and $g_2(S)$ as his commitment.
Example:

$$g_1(x) = x^5 + x^4 \quad g_1(S) = \{g_1(2), g_1(4), g_1(6)\} = \{6, 6, 0\}$$

$$g_2(x) = x + 1 \quad g_2(S) = \{g_2(2), g_2(4), g_2(6)\} = \{3, 5, 0\}$$

PASS Challenge Step

Alice choose four binary polynomials $c_1(x)$, $c_2(x)$, $C_3(x)$, and $c_4(x)$ (possibly satisfying some other constraints) and sends them to Bob as her challenge.
Example:

$$c_1(x) = x^3 + x \quad c_1(S) = \{c_1(2), c_1(4), c_1(6)\} = \{3, 5, 5\}$$

$$c_2(x) = x^5 + x^4 \quad c_2(S) = \{c_2(2), c_2(4), c_2(6)\} = \{6, 6, 0\}$$

$$c_3(x) = x^5 + x^2 \quad c_3(S) = \{c_3(2), c_3(4), c_3(6)\} = \{1, 4, 0\}$$

$$c_4(x) = x^5 + x \quad c_4(S) = \{c_4(2), c_4(4), c_4(6)\} = \{6, 6, 5\}$$

PASS Response Step

Bob computes the polynomial $$h(x)=f_1(x)g_1(x)c_1(x)+f_1(x)g_2(x)c_2(x)+f_2(x)g_1(x)c_3(x)+f_2(x)g_2(x)c_4(x).$$

and sends h(x) to Alice as his response. (Remember that h(x) is computed using the rule $x^{N=1}$ and that the coefficients are computed modulo q.)
Example:

$$h(x) = (x^4 + 1)(x^5 + x^4)(x^3 + x) + (x^4 + 1)(x + 1)(x^5 + x^4) +$$

$$(x^5 + x)(x^5 + x^4)(x^5 + x^2) + (x^5 + x)(x + 1)(x^5 + x)$$

$$= 5x^4 + 5x^3 + 5x^2 + 4x + 6$$

PASS Verification Step

Verification consists of two steps. First Alice writes the polynomial h(x) as $h_0+h_1+h_2x^2+ \ldots +h_{N-1}x^{N-1}$ with coefficients $h_0 h_1 \ldots h_{N-1}$ modulo q taken as close as possible to $A_h$ and she computes the quantity $$C=(h_0-Ah)^2+(h_1-A_h)^2+(h_2-A_h)^2+ \ldots +(h_{N-1}-A_H)^2.$$

She compares the number C to the number $B_h$. If C is smaller than $B_h$, then Bob's response passes the first test. If C is larger than $B_h$, then Bob's response fails the first test.

Second, for each number b in the set S, Alice computes the two numbers $$h(b) \text{ (modulo } q)$$

and $$f(b)g_1(b)c_1(b)c_1(b)c_2(b)+f_2(b)g_1(b)c_3(b)+f_2(b)g_2(b)c_4(b) \text{ (modulo } q).$$

If they are the same for every number b in the set S, then Bob's response passes the second test; otherwise his response fails the second test.

Note that Alice has enough information to compute these quantities, because she knows the polynomials h(x), $c_1(x)$, $c_2(x)$, $C_3(x)$ and $C_4(x)$ and she knows the values of $f_1(b)$, $f_2(b)$, $g_1(b)$, and $g_2,b$) for every number b in the set S.
Example:

For the example, the polynomial h(x) is $5x^4+5x^3+5x^2+4x+6$ and the number $A_h$ is equal to 5.

This means that Alice should write h(x) as $$h(x)=7x^5+5x^4+5x^3+5x^2+4x+6$$

since she wants the coefficients, which are numbers modulo 7, to be as close to 5 as possible.

Then she computes $$C=(7-5)^2+(5-5)^2+(5-5)^2+(5-5)^2+(4-5)^2+(6-5)^2=6.$$

This is smaller than the bound $B_h=9$, so Bob's response passes the first test.

Next Alice computes the values $h(2)=0$ (modulo 7), $h(4)=1$ (modulo 7), $h(6)=0$ (modulo 7).

and $f_1(2)g_1(2)c_1(2)+f_1(2)g_2(2)c_2(2)+f_2(2)g_1(2)c_3(2)+f_2(2)g_2(2)c_4(2)=0$ (modulo 7), $f_1(4)g_1(4)c_2(4)+f_2(4)g_2(4)c_2(4)+f_2(4)g_1(4)c_3(4)+f_2(4)g_2(4)c_4(4)=1$ (modulo 7), $f_1(6)g_1(6)c_2(6)+g_1(6)g_2(6)c_2(6)+f_2(6)g_1(6)c_3(6)+f_2(6)g_2(6)c_4(6)=0$ (modulo 7).

Since these values match the values of h, Bob's response passes the second test, so Alice accepts that Bob is really who he says he is.

The user identification and digital signature techniques of the present invention provide significantly improved computational efficiency relative to prior art techniques at equivalent security levels, while also reducing the amount of information which must be stored by the Prover and Verifier and communicated between the Prover and Verifier. It should be emphasized that the techniques described above are exemplary and should not be construed as limiting the present invention to a particular group of illustrative embodiments. Alternative embodiments within the scope of the appended claims will be readily apparent to those skilled in the art.

What is claimed is:

1. A method of communicating information between users of a communication system, the method comprising the steps of:

transmitting from a first user to a second user a result $\phi(g)$ of evaluating an element g in a ring R by a ring homomorphism $\phi:R \to B$, wherein the element g satisfies a first set of predetermined conditions;

generating an element h in the ring R as a function of an element c in the ring R satisfying a second set of predetermined conditions, a private key element f of the first user in the ring R, wherein the element f satisfies a third set of predetermined conditions; and transmitting the element h from the first user to the second user, such that the second user can authenticate the communication from the first user by verifying that the element h satisfies a fourth set of predetermined conditions and by comparing the result $\phi(h)$ of evaluating the element h by the ring homomorphism o to a function of $\phi(g)$, $\phi(c)$, and a public key $\phi(f)$ of the first user.

2. The method of claim 1 wherein the element c is generated by the second user as a challenge to the first user in response to receipt of the result $\phi(g)$.

3. The method of claim 2 wherein the second user authenticates the identity of the first user based on the result of the step of comparing $\phi(h)$ to a function of $\phi(g)$, $\phi(c)$ and $\phi(f)$.

4. The method of claim 1 wherein the element c is generated by the first user applying a hash function to the result $\phi(g)$ and a message m, and the method further includes the step of transmitting the message m from the first user to the second user.

5. The method of claim 4 wherein the second user authenticates a digital signature of the first user based on the result of the step of applying a hash function to the result $\phi(g)$ and the message m to generate an element c, and the method further includes the step of comparing $\phi(h)$ to a function of $\phi(g)$, $\phi(c)$ and $\phi(f)$.

6. The method of claim 1 wherein the ring R is a ring of functions.

7. The method of claim 6 wherein the homomorphism $\phi$ is the evaluation homomorphism at a set of values $a_1, a_2 \ldots a_s$.

8. The method of claim 1 wherein the element h generated as a function of the element c, a private key f, and the first element g, is generated as the value of a polynomial P(f,c,g), wherein P(X,Y,Z) is a polynomial with coefficients in R.

9. The method of claim 8 wherein the second user authenticates the communication from the first user by comparing the result $\phi(h)$ of evaluating the element h by the ring homomorphism $\phi$ to the result of evaluating $\phi(P)(\phi(f)\phi, \phi(c), \phi(g))$, wherein $\phi(P)$ is the polynomial obtained by evaluating the coefficients of the polynomial P by the ring homomorphism $\phi$.

10. The method of claim 8 wherein the polynomial P(X,Y,Z) is the polynomial $ZX+Z^2Y$.

11. The method of claim 8 wherein f is a nc-tuple, c is an nc-tuple, and g is an ng-tuple and P is a polynomial in $n_f+n_c+n_g$ variables.

12. The method of claim 11 wherein $n_c$ is equal to $n_f n_g$ and the polynomial P is equal to the summation of $X_i Y_{ij} Z_j$ as i ranges from 1 to $n_f$ and j ranges from 1 to $n_g$.

13. The method of claim 1 wherein the ring R is the ring $Fq[X]/(X^N-1)$ of polynomials over the field $F_q$ of q elements modulo the ideal generated by the polynomial $X^N-1$ and wherein N is a divisor of q-1.

14. The method of claim 13 wherein the first set of predetermined conditions on the element g are that the coefficients of g are small compared to q.

15. The method of claim 13 wherein the second set of predetermined conditions on the element c are that the coefficients of c are small compared to q.

16. The method of claim 13 wherein the third set of predetermined conditions on the element f are that the coefficients of f are small compared to q.

17. The method of claim 13 wherein the fourth set of predetermined conditions on the element h are that the coefficients of h are small compared to q.

18. A method of communicating information between users of a communication system, the method comprising the steps of:

generating an element h in a ring R as a function of an element g in the ring R satisfying a first set of predetermined conditions, an element c in the ring R satisfying a second set of predetermined conditions, and a private key element f of a first user in the ring R satisfying a third set of predetermined conditions;

transmitting the element h from the first user to a second user, such that the second user can authenticate the communication from the first user by verifying that the element h satisfies a fourth set of predetermined conditions and by using a ring homomorphism $\phi:R+B$ and verifying that the quantity $\phi(h)$, the quantity $\phi(c)$, and a public key $\phi(f)$ of the first user satisfy a fifth set of predetermined conditions.

19. The method of claim 18 wherein h is also a function of an element g, in the ring R, and wherein the element $+(g_1)$ is transmitted from the first user to the second user and wherein the second user also uses $\phi(g_1)$ to authenticate the communication.

20. The method of claim 18 wherein the element c is generated by the second user as a challenge to the first user.

21. The method of claim 20 wherein the second user authenticates the identity of the first user based on the result of the step of verifying that the element h satisfies the fourth set of predetermined conditions and that the quantities ø(h), ø(c), and ø(f) satisfy the fifth set of predetermined conditions.

22. The method of claim 18 wherein the element c is generated by the first user applying a hash function to the message m, and the method further includes the step of transmitting the message m from the first user to the second user.

23. The method of claim 22 wherein the second user authenticates a digital signature of the first user based on the result of the step of applying a hash function to the message m to generate an element c, and the method further includes the step verifying that the element h satisfies the fourth set of predetermined conditions and that the quantities ø(h), ø(c), and ø(f) satisfy the fifth set of predetermined conditions.

24. The method of claim 18 wherein the ring R is a ring of functions.

25. The method of claim 24 wherein the homomorphism ø is the evaluation homomorphism at a set of values $a_1, a_2 \ldots, a_s$.

26. The method of claim 18 wherein the element h generated as a function of the element c, a private key f, and the first element g, is generated as the value of a polynomial P(f,c,g), wherein P(X,Y,Z) is a polynomial with coefficients in R.

27. The method of claim 26 wherein the fifth set of predetermined conditions by which the second user authenticates the communication from the first user are that the equation ø(P)(ø(f),ø(c),Z)=0 has a solution Z in the ring R, wherein ø(P) is the polynomial obtained by evaluating the coefficients of the polynomial P by the ring homomorphism ø.

28. The method of claim 26 wherein the polynomial P(X,Y,Z) is the polynomial $ZX+Z^2Y$.

29. The method of claim 26 wherein f is a $n_f$-tuple, c is an $n_c$-tuple, and g is an $n_g$-tuple and P is a polynomial in $n_f+n_c+n_g$ variables.

30. The method of claim 29 wherein the polynomial P is equal to $XZ_2+Y_1Z_1Z_2+Y_2Z_2^2$.

31. The method of claim 30 wherein the fifth set of predetermined conditions is that $(\phi(\phi+\phi(C_1)\phi(g_1))^2+4(c_2)\phi(h)$ is the square of an element of the ring B.

32. The method of claim 28 wherein the fifth set of predetermined conditions by which the second user authenticates the communication from the first user are that the quantity $ø(f)^2+4ø(c)ø(h)$ is the square of an element of the ring B.

33. The method of claim 18 wherein the ring R is the ring $Fq[X]/(X^N-1)$ of polynomials over the field $F_q$ of q elements modulo the ideal generated by the polynomial $X^N-1$ and wherein N is a divisor of q−1.

34. The method of claim 33 wherein the first set of predetermined conditions on the element g are that the coefficients of g are small compared to q.

35. The method of claim 33 wherein the second set of predetermined conditions on the element c are that the coefficients of c are small compared to q.

36. The method of claim 33 wherein the third set of predetermined conditions on the element f are that the coefficients of f are small compared to q.

37. The method of claim 33 wherein the fourth set of predetermined conditions on the element h are that the coefficients of h are small compared to q.

38. A method for authenticating, by a second user, the identity of a first user, that includes a challenge communication from the second user to the first user, a response communication from the first user to the second user, and a verification by the second user, comprising the steps of:
 selection by the first user of a private key f in a ring R and a public key that includes φ(f) in a ring B that is mapped from f using the ring homomorphism φ: R→B, and publication by the first user of the public key;
 generation of the challenge communication by the second user that includes selection of a challenge c in the ring R;
 generation of the response communication by the first user that includes computation of a response comprising h in the ring R, where h is a function of c and f, and
 performing of a verification by the second user that includes determination of φ(c) from c, φ(h) from h, and an evaluation that depends on φ(h), φ(c) and φ(f).

39. The method as defined by claim 38, wherein said generation of the response communication by the first user includes selection by the first user of an element g in the ring R, and wherein h is also a function of g.

40. The method as defined by claim 39, wherein φ(g) is also communicated to the second user, and wherein said performing of a verification includes an evaluation that also depends on φ(g).

41. The method as defined by claim 39, wherein said authentication includes an initial commitment communication from said first user to said second user, and wherein said commitment communication includes φ(g).

42. The method as defined by claim 39, wherein said first user further selects an element g, in the ring R and determines $φ(g_1)$ therefrom, and further comprising communicating $φ(g_1)$ to the second user.

43. The method as defined by claim 42, wherein said authentication includes an initial commitment communication from said first user to said second user, and wherein said commitment communication includes $φ(g_1)$.

44. The method as defined by claim 39, wherein f, c, and g are elements in respective subsets of the ring R.

45. The method as defined by claim 42, wherein f, c, g, and g, are elements in respective subsets of the ring R.

46. The method as defined by claim 39, wherein f, c, g, and h are polynomials, and wherein φ(f), φ(c), φ(g) and φ(h) each represent one or more values of the respective polynomials from which they are mapped.

47. The method as defined by claim 43, wherein f, c, g, g, and h are polynomials, and wherein φ(f), φ(c), φ(g), $φ(g_1)$ and φ(h) each represent one or more values of the respective polynomials from which they are mapped.

48. The method as defined by claim 39, wherein said step of generation of the response includes computation of h in the form h=(f+cg)g.

49. The method as defined by claim 39, wherein at least one of the elements f, c, and g is an n-tuple with n greater than 1, and φ evaluated at an n-tuple of elements $(r_1, r_2 \ldots r_n)$ of R is equal to the n-tuple of respective values $(φ(r_1), φ(r_2) \ldots φ(r_n))$ of φ.

50. The method as defined by claim 40, wherein at least one of the elements f, c, and g is an n-tuple with n greater than 1, and φevaluated at an n-tuple of elements $(r_1, r_2, \ldots r_n)$ of R is equal to the n-tuple of respective values $(φ(r_1), φ(r_2) \ldots φ(r_n))$ of φ.

51. The method as defined by claim 41, wherein at least one of the elements f, c, and g is an n-tuple with n greater than 1, and φ evaluated at an n-tuple of elements $(r_1, r_2 \ldots r_n)$ of R is equal to the n-tuple of respective values $(φ(r_1), φ(r_2) \ldots (r_n))$ of φ.

52. The method as defined by claim 42, wherein at least one of the elements f, c, and g is an n-tuple with n greater than 1, and $\phi$ evaluated at an n-tuple of elements $(r_1, r_2 \ldots r_n)$ of R is equal to the n-tuple of respective values $(\phi(r_1), \phi(r_2) \ldots (r_n))$ of $\phi$.

53. The method as defined by claim 43, wherein at least one of the elements f, c, and g is an n-tuple with n greater than 1, and $\phi$ evaluated at an n-tuple of elements $(r_1, r_2 \ldots r_n)$ of R is equal to the n-tuple of respective values $(\phi(r_1), \phi(r_2) \ldots (r_n))$ of $\phi$.

54. The method as defined by claim 52, wherein element c includes the pair $c_1$, $c_2$ and elements $g_1$, $g_2$, correspond respectively to the pair $g_1$, $g_2$, and wherein h is of the form $$h=(f+c_1g_1+c_2g_2)g_2.$$

55. The method as defined by claim 53, wherein element c includes the pair $c_1$, $c_2$ and elements $g_1$, g correspond respectively to the pair $g_1$, $g_1$, and wherein h is of the form $$h=(f+c_1g_1+c_2g_2)g_2.$$

56. The method as defined by claim 50, wherein element f includes the pair $f_1$, $f_2$, element g includes the pair $g_1$, $g_2$, and element c includes the 4-tuple $C_{11}, c_{12}, c_{12}, c_{21}, C_{22}$, and wherein h is of the form $$h=f_1g_1c_{11}+f_1g_1c_{12}+f_2g_1c_{21}+f_2g_2c_{22}.$$

57. The method as defined by claim 51, wherein element f includes the pair $f_1$, $f_2$, element g includes the pair $g_1$, $g_2$, and element c includes the 4-tuple $c_{11}, c_{12}, C_{12}, c_{21}, c_{22}$, and wherein h is of the form $$h=f_1g_1c_{11}+f_1g_1c_{12}+f_2g_1c_{21}+f_2g_2c_{22}.$$

58. The method as defined by claim 42, wherein said verification includes a determination of whether certain values of functions of $\phi(f)$, $\phi(c)$, $\phi(g_1)$, $\phi(h)$ are squares modulo q, where q is a certain integer modulus used in key creation by the first user.

59. The method as defined by claim 43, wherein said verification includes a determination of whether certain values of functions of $\phi(f)$, $\phi(c)$, $\phi(g_1)$, $\phi(h)$ are squares modulo q, where q is a certain integer modulus used in key creation by the first user.

60. The method as defined by claim 53, wherein said verification includes a determination of whether certain values of functions of $\phi(f)\phi$, $\phi(c)$, $\phi(g_1)$, $\phi(h)$ are squares modulo q, where q is a certain integer modulus used in key creation by the first user.

61. The method as defined by claim 55, wherein said verification includes a determination of whether certain values of functions of $\phi(f)$, $\phi(c)$, $\phi(g_1)$, $\phi(h)$ are squares modulo q, where q is a certain integer modulus used in key creation by the first user.

62. An authentication method that includes authenticating, by a second user, of a signed digital message of a first user communicated from said first user to said second user, comprising the steps of:

selecting by the first user, of a private key f in a ring R and a public key that includes $\phi(f)$ in a ring B that is mapped from f using the ring homomorphism $\phi$: R→B, and publication by the first user of the public key;

selecting, by the first user, of an element $g_1$ in the ring R, determining $\phi(g_1)$, and applying a hash function to at least a message m to produce an element c;

generating, by the first user, an element h which is a function of c and f;

communicating, from the first user to the second user, the message m and a digital signature comprising $\phi(g_1)$ and h;

determining, by the second user, of the element c, by applying a hash function to at least the message m, and determining, by the second user of $\phi(c)$ from c and $\phi(h)$ from h; and authenticating, by the second user, of the digital signature, said authenticating including an evaluation that depends on $\phi(h)$, $\phi(f)$ and $\phi(c)$.

63. The method as defined by claim 62, wherein said steps, by the first user and the second user, of applying a hash function to at least the message m, comprise applying a hash function to the message m.

64. The method as defined by claim 62, wherein said steps, by the first user and the second user, of applying a hash function to at least the message m, comprise applying a hash function to a combination of the message m and $\phi(g_1)$.

65. The method as defined by claim 62, wherein f, c, and g, are elements in respective subsets of the ring R.

66. The method as defined by claim 62, wherein f, c, $g_1$, and h are polynomials, and wherein $\phi(f)$, $\phi(c)$, $\phi(g_1)$ and $\phi(h)$ each represent one or more values of the respective polynomials from which they are mapped.

67. The method as defined by claim 54, wherein f, c, $g_1$, and h are polynomials, and wherein $\phi(f)$, $\phi(c)$, $\phi(g_1)$ and $\phi(h)$ each represent one or more values of the respective polynomials from which they are mapped.

68. The method as defined by claim 62, wherein h is of the form $h=(f+cg_1)g_1$.

69. The method as defined by claim 66, wherein at least one of the elements f, c, and $g_1$ is an n-tuple with n greater than 1.

70. The method as defined by claim 67, wherein at least one of the elements f, c, and $g_1$ is an n-tuple with n greater than 1.

71. The method as defined by claim 70, wherein element c includes the pair $c_1$, $c_2$ and element $g_1$ is part of the pair $g_1$, $g_2$, and wherein h is of the form $$h=(f+c_1g_1+c_2g_2)g_2.$$

72. The method as defined by claim 69, wherein element f includes the pair $f_1$, $f_2$, element g, is part of the pair $g_1$, $g_2$, and element c includes the 4-tuple $c_{11}, c_{12}, C_{12}, c_{21}, c_{22}$, and wherein h is of the form $$h=f_1g_1c_{11}+f_1g_1c_{12}+f_2g_1c_{21}+f_2g_2c_{22}.$$

73. The method as defined by claim 58, wherein said verification includes a determination of whether certain values of functions of $\phi(f)$, $\phi(c)$, $\phi(g_1)$, $\phi(h)$ are squares modulo q, where q is a certain integer modulus used in key creation by the first user.

74. A method for use by a first user to prove its identity to a second user who sends a challenge to the first user and wishes to authenticate the identity of the first user, comprising the steps of:

selecting a private key f in a ring R and a public key that includes $\phi(f)$ in a ring B that is mapped from f using the ring homomorphism $\phi$: R→B, and publication by the first user of the public key;

receiving the challenge communication from the second user that includes selection of a challenge element c in the ring R; and generation of the response communication that includes computation of a response comprising h in the ring R, where h is a function of c and f;

whereby the second user can perform a verification that includes determination of $\phi(c)$ from c, $\phi(h)$ from h, and an evaluation that depends on $\phi(h)$, $\phi(c)$ and $\phi(f)$.

75. A method for producing and sending a signed digital message comprising the steps of:

selecting a private key f in a ring R and a public key that includes $\phi(f)$ in a ring B that is mapped from f using the ring homomorphism $\phi: R \rightarrow B$, and publication by the first user of the public key;

selecting an element $g_1$ in the ring R, determining $\phi(g_1)$, and applying a hash function to at least a message m to produce an element c;

generating an element h which is a function of c and f; and communicating the message m and a digital signature comprising $\phi(g_1)$ and h.

* * * * *